Dec. 16, 1941.  J. WIMMER  2,266,527
PATCH CUTTING APPARATUS
Filed Sept. 4, 1941  5 Sheets-Sheet 1
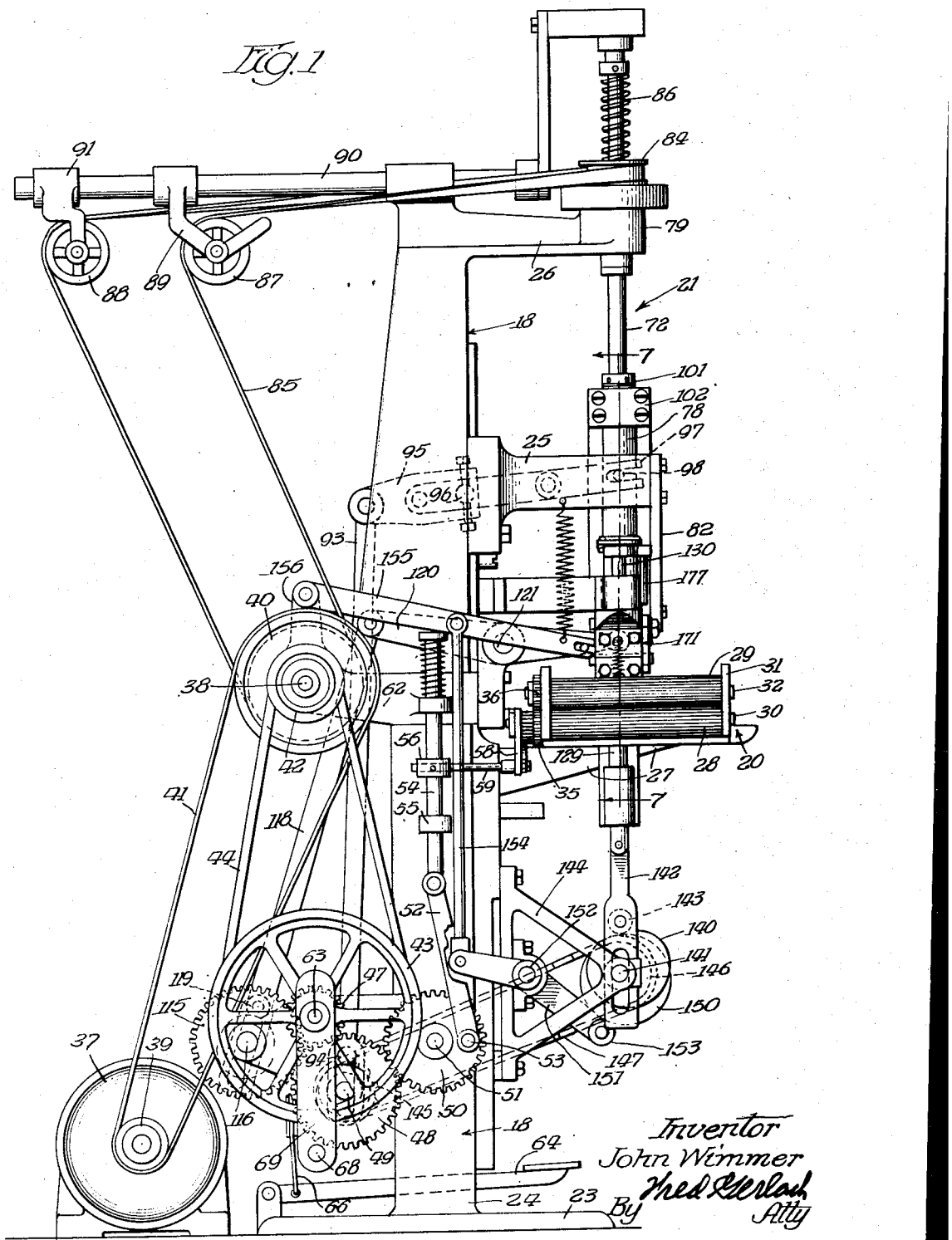
Inventor
John Wimmer
By Fred L. Gerlach
Atty

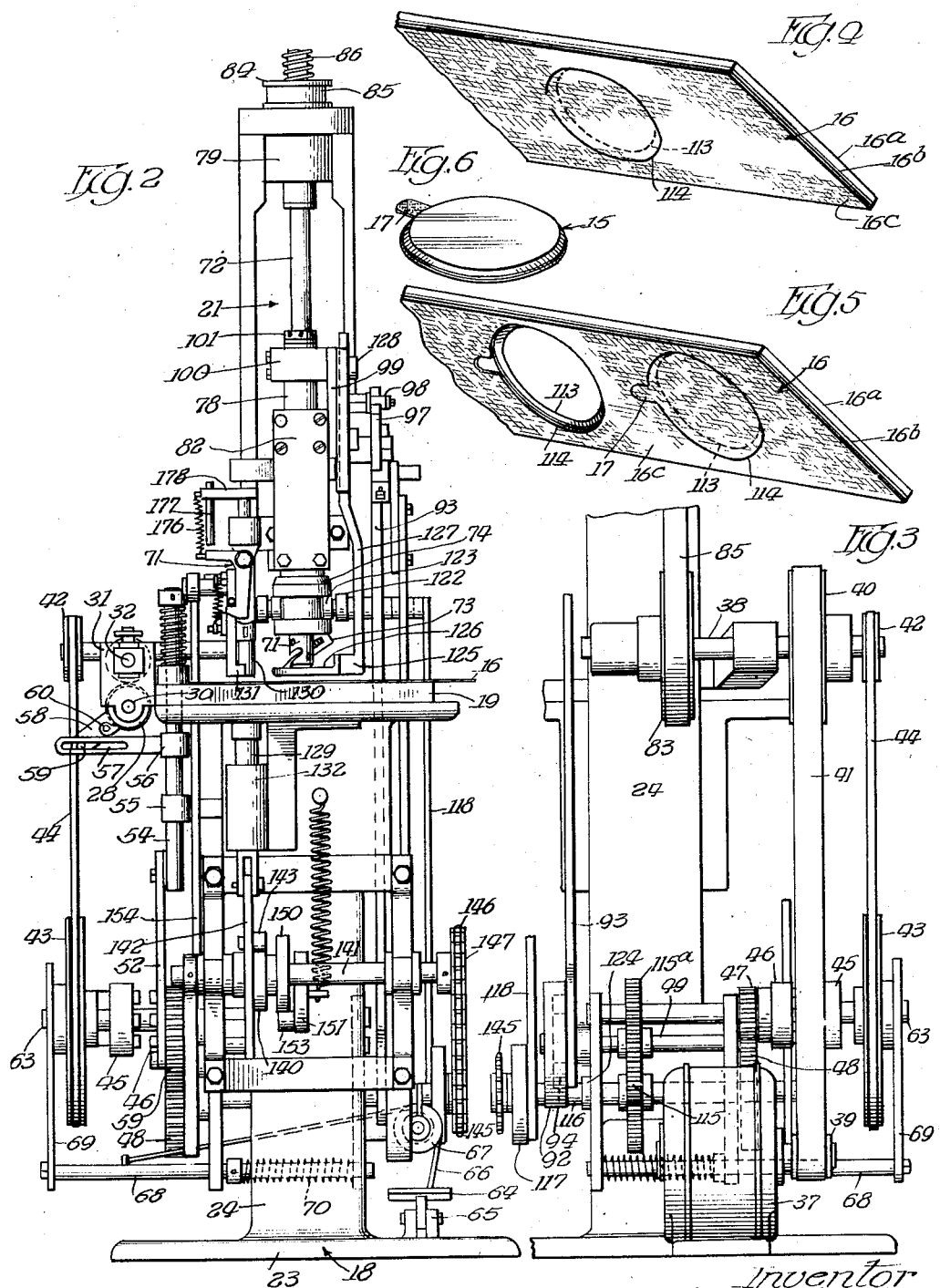

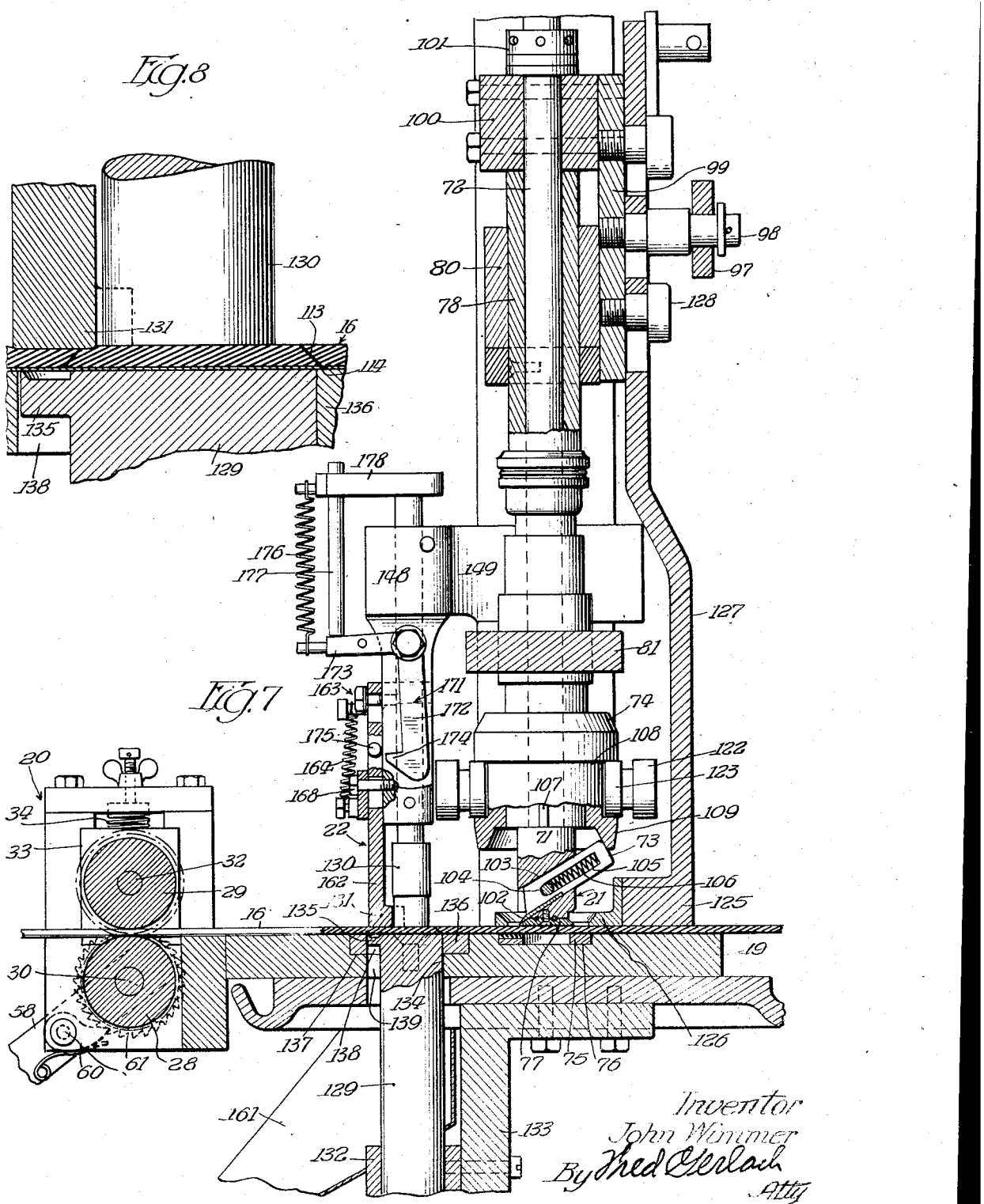

Dec. 16, 1941.                J. WIMMER                2,266,527
                        PATCH CUTTING APPARATUS
              Filed Sept. 4, 1941          5 Sheets-Sheet 4
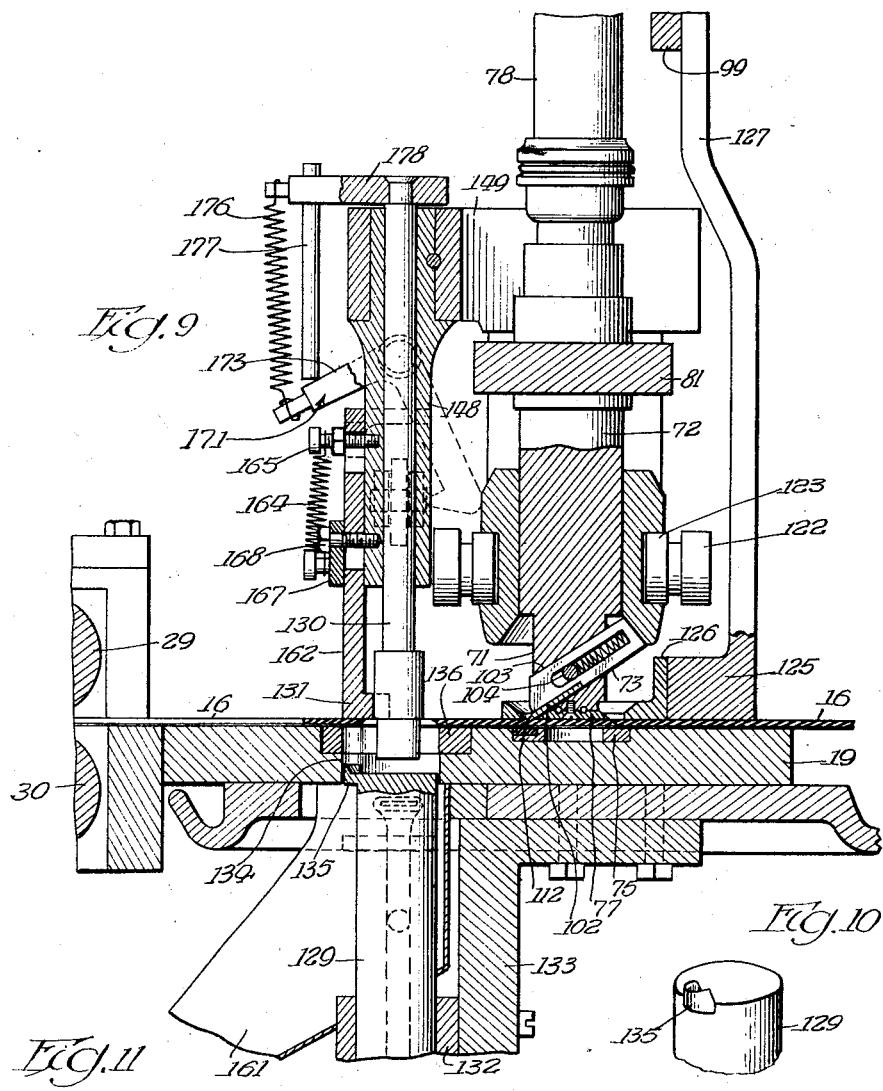
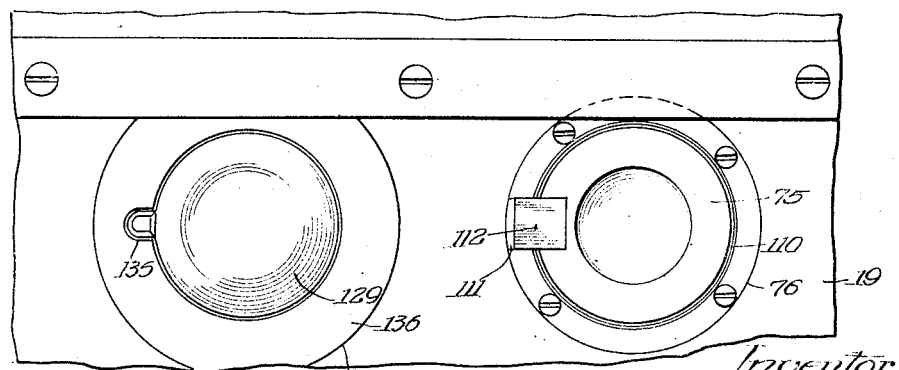
Inventor
John Wimmer
By Fred Gerlach Atty.

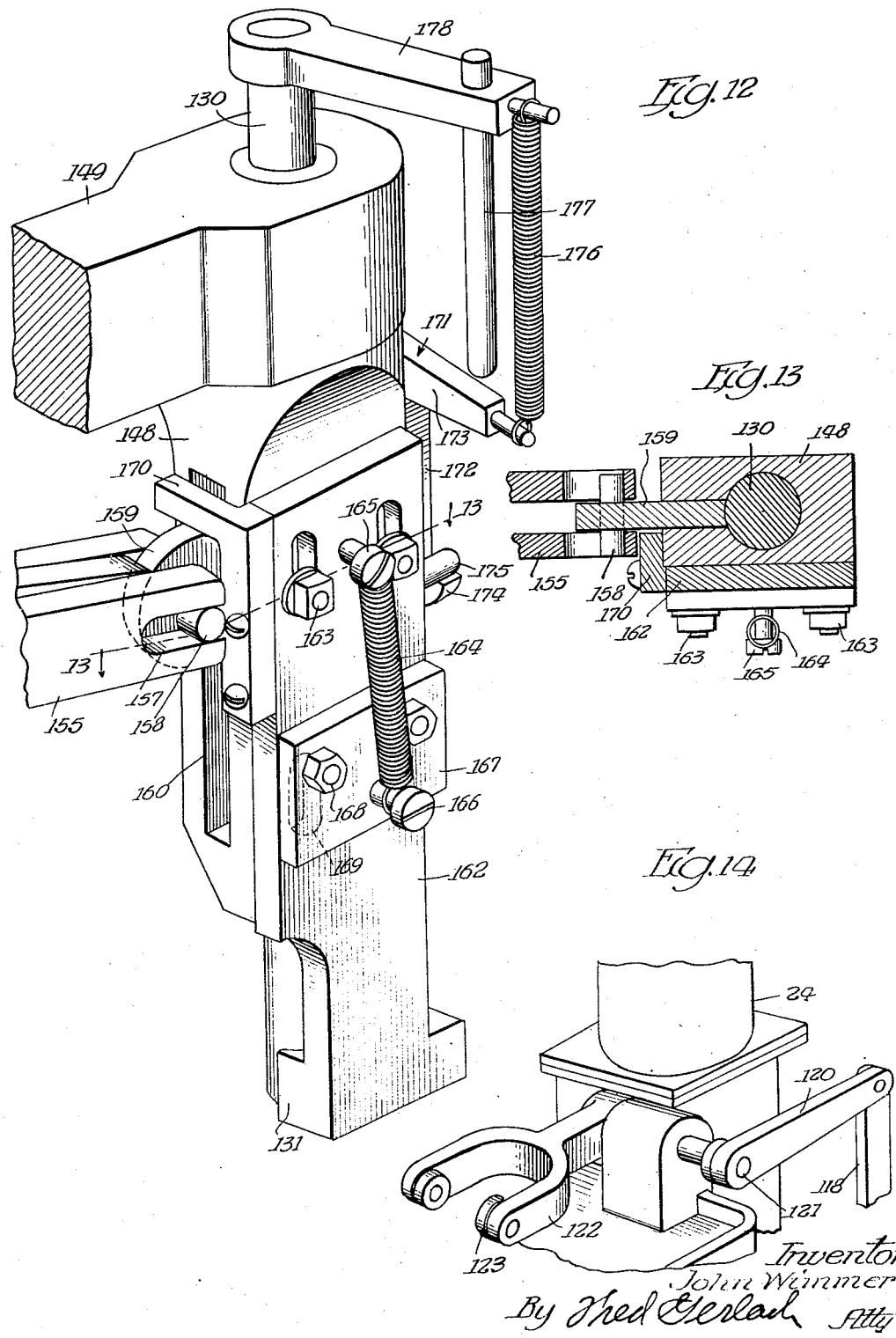

Patented Dec. 16, 1941

2,266,527

UNITED STATES PATENT OFFICE 2,266,527

PATCH CUTTING APPARATUS

John Wimmer, Chicago, Ill., assignor to Van Cleef Bros., Chicago, Ill., a partnership consisting of Noah Van Cleef, Paul Van Cleef, and Felix Van Cleef Application September 4, 1941, Serial No. 409,467

17 Claims. (Cl. 164—12)

The present invention relates generally to cutting apparatus. More particularly the invention relates to that type of cutting apparatus which is expressly designed to cut circular bevel-edged tire patches from a composite strip consisting of an outer layer of vulcanized or cured rubber, an inner layer of uncured rubber, and a sheet of holland or like material on the bottom or outer face of the inner layer.

In a standard or conventional tire patch of the character under consideration the holland is truly circular and there is a sharp corner or feather edge formation between the holland and the uncured rubber inner layer. When it is desired to use the patch it is necessary to remove the holland so as to expose the bottom or outer face of the inner layer for patch applying purposes. Because of the sharp corner or feather edge formation in a standard or conventional patch it is extremely difficult to grip the holland and remove it from the inner layer.

One object of the present invention is to provide a cutting apparatus of the aforementioned type which operates to cut circular bevel-edged patches from a strip of patch-forming material or stock in such manner that the holland pieces embody integral outwardly projecting tabs which facilitate handling of the patches and make it possible readily to strip the holland pieces from the uncured rubber inner layers of the patches.

Another object of the invention is to provide a patch cutting apparatus of the last mentioned character which comprises a worktable for supporting the strip of patch forming material, mechanism for feeding the strip intermittently or step by step across the table, mechanism including a rotary head above the table and an angularly disposed longitudinally slidable knife on the head, for initially cutting the strip while it is at rest on the worktable so that it has a truly circular tapered or bevel type cut in the outer and inner rubber layers and a discontinuous substantially circular cut in the holland sheet, and mechanism which acts on the strip after the preliminary cutting thereof by the cutting mechanism and during the next rest period to cut the portion of the holland sheet that is adjacent the ends of the discontinuous cut so as to form the tab for the patch.

A further object of the invention is to provide a patch cutting apparatus which is generally of new and improved construction and is so designed and constructed that it is extremely efficient in operation.

A still further object of the invention is to provide a patch cutting apparatus which is an improvement upon, and has certain advantages over, that which forms the subject matter of United States Letters Patent No. 1,985,356, granted December 25, 1934, to Paul Van Cleef of Chicago, Illinois.

Other objects of the invention and the various advantages and characteristics of the present patch cutting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a patch cutting apparatus embodying the invention;

Figure 2 is a front view;

Figure 3 is a fragmentary rear view of the apparatus;

Figure 4 is a bottom perspective view showing a portion of the composite strip of patch-forming material after the knife on the rotary head of the preliminary cutting mechanism has made a circular cut or incision through the outer and inner rubber layers thereof and a discontinuous substantially circular cut in the holland sheet on the bottom or under face of the inner layer;

Figure 5 is a bottom perspective view of the strip showing the sheet of holland after it has been cut adjacent the ends of the discontinuous substantially circular cut by the tab cutting mechanism in order to form the tab and complete the patch;

Figure 6 is a perspective view of a complete tire patch, that is, a patch which has been cut by the present apparatus;

Figure 7 is a vertical transverse section taken on the line 7—7 of Figure 1 and illustrating the rotary knife carrying head of the preliminary cutting mechanism in its operative or cutting position and the various parts of the tab cutting mechanism of the apparatus in their operative or tab cutting position;

Figure 8 is an enlarged fragmentary section showing in detail the manner in which the parts of the tab cutting mechanism operate to cut the holland sheet and form the tab after preliminary cutting of the strip by the cutting mechanism;

Figure 9 is a fragmentary vertical transverse section showing the ejector plunger after it has been lowered so as to disconnect the cut tab-equipped patch from the strip of patch-forming material;

Figure 10 is a fragmentary perspective view of the reciprocatory blade-equipped plunger which forms a part of the tab cutting mechanism of the apparatus;

Figure 11 is a fragmentary plan view of the worktable illustrating in detail the construction and design of the discontinuous metallic die ring which coacts with the knife on the rotary head to form a circular or continuous cut in the outer and inner layers of the strip and a discontinuous cut in the holland sheet in connection with a cutting operation;

Figure 12 is a fragmentary perspective view of the hammer and other parts of the tab cutting mechanism of the apparatus;

Figure 13 is a horizontal section on the line 13—13 of Figure 12; and

Figure 14 is a fragmentary perspective view of the mechanism for feeding the knife of the preliminary cutting mechanism outwardly and downwardly into the strip in connection with cutting of the strip by the knife.

The cutting apparatus which is shown in the drawings constitutes the preferred form or embodiment of the invention. It is designed to cut circular bevel-edged tire patches 15 from a composite strip 16 of patch forming material. The strip 16 comprises an outer layer 16ª of vulcanized or cured rubber, an inner layer 16ᵇ of uncured rubber, and a sheet 16ᶜ of holland or like material on the bottom or outer face of the inner layer. The inner layer 16ᵇ of uncured rubber is joined to the outer layer 16ª of cured rubber by cohesion. The holland sheet 16ᶜ is adhesively connected to the bottom or outer face of the lower layer of the strip due to the tackiness of such layer. The patches 15 which are cut by the apparatus have sharp corners or feather edge formations between the holland pieces and the uncured rubber inner layers and are characterized by the fact that the holland pieces are provided with outwardly extending tabs 17. In using the patches the holland pieces on the bottom or outer faces of the inner layers are first removed. Thereafter the uncured rubber layers of the patches are pressed against the portions of the tires or tubes which are to be repaired, as well understood in the art. The tabs 17 on the holland pieces of the patches 15 facilitate gripping of such pieces in connection with stripping thereof from the uncured rubber inner layers of the patches.

As hereinafter described more in detail, the improved cutting apparatus operates automatically so to cut the patches 15 from the strip 16 of patch forming material that the holland pieces are provided with the tabs 17. In general the apparatus comprises a supporting structure 18 including a worktable 19; mechanism 20 for feeding the strip 16 of patch forming material step by step or intermittently across the worktable 19; mechanism 21 for initially cutting the strip while it is at rest on the worktable so that it has a truly circular bevel-type cut in the outer and inner rubber layers 16ª and 16ᵇ and a discontinuous substantially circular cut in the holland sheet 16ᶜ; and mechanism 22 which acts on the strip after the preliminary cutting thereof by the cutting mechanism 21 and during the next rest period of the strip to cut the portion of the holland sheet that is adjacent the ends of the discontinuous cut in order to form the tab 17 for the patch. It is contemplated that the apparatus shall be continuously operated so as to cut the desired tab equipped patches in rapid succession from the strip 16.

Supporting structure

The supporting structure 18 of the cutting apparatus comprises in addition to the worktable 19, a base 23, a vertically extending standard 24, and a pair of horizontally extending arms 25 and 26. The standard 24 is formed integrally with and projects upwardly from the central portion of the base 23. The worktable 19 extends horizontally and is located in front of the central portion of the standard 24. It is carried by a bracket 27 and is adapted to support the strip 16 of patch forming material and to have the latter drawn intermittently or step by step transversely thereacross by means of the mechanism 22. The bracket 27 is suitably secured to and projects forwardly from the central portion of the standard 24. The arm 25 is located directly above the worktable 19 and is suitably secured to the standard 24. The other arm, that is the arm 26, is formed integrally with and projects forwardly from the upper end of said standard 24 and is positioned so that it is vertically aligned with, and overhangs, the arm 25.

Intermittent feed mechanism

The intermediate feed mechanism 20 comprises a pair of horizontally extending fluted feed rolls 28 and 29 at one end of the worktable 19. The feed roll 28 is located directly beneath, and is arranged in parallel relation with, the feed roll 29 and is carried by way of a shaft 30 which extends longitudinally therethrough. The ends of the shaft 30 are journalled in a pair of bearing brackets 31, and these are suitably connected to the adjacent end of the worktable 19. The feed roll 29 is supported by a shaft 32 and this shaft extends longitudinally through the feed roll 29 and has its ends journalled in bearing blocks 33 which are slidable vertically in order that the feed roll 29 is free to move vertically to a limited extent to and from the feed roll 28. Compression springs 34 are associated with the bearing blocks 33 and serve to urge the feed roll 29 towards the feed roll 28. The two feed rolls are connected together for conjoint rotation in opposite directions by means of a pair of gears 35 and 36 and these are intermittently driven as hereinafter described so as to cause the strip 15 to be fed step by step or intermittently across the worktable 19. As shown in Figure 7 the strip 16 of patch forming material extends between the two feed rolls and the latter extend transversely of the worktable 19. The gear 35 is fixed to the inner end of the shaft 30 for supporting the feed roll 28 and the gear 36 meshes with the gear 35 and is fixed to the inner end of the shaft 32 for supporting the upper feed roll 29.

The means for intermittently driving the feed rolls 28 and 29 comprises an electric motor 37 which is connected to drive a horizontally extending shaft 38 behind the central portion of the standard 18 of the supporting structure by way of a belt and pulley connection consisting of a pulley 39 on the armature shaft of the motor, a pulley 40 on the shaft 38, and an endless belt 41 around the two pulleys; a second belt and pulley connection consisting of a pulley 42 on the shaft 30, a pulley 43 beneath the pulley 42 and an endless belt 44 around the two pulleys 42 and 43; a pair of clutch members 45 and 46; a pinion 47; a gear 48 which meshes with and is driven by the pinion 47 and is mounted on a horizontally extending shaft 49; a gear 50 which is in mesh with and is driven by the gear wheel 48 and is mounted on a stub shaft 51 on the lower end of the standard 24 of the supporting structure 18; a link 52 which extends substantially vertically and has the lower end thereof pivotally connected to an eccentric stud 53 on the gear 50; a vertically extending rod 54 which is mounted to slide vertically in bearings 55 on the standard 24 and has its lower end connected to the upper end of the link 52; a horizontally extending arm 56 which is fixed to and projects outwardly from the central portion of the rod 54 and has a longitudinally extending slot 57 in its outer end; an arm 58 which is loosely mounted on and projects radially from the inner end of the shaft 30 and is provided at its outer end with a horizontally extending pin 59 which projects into the longitudinally extending slot 57 in the outer end of the arm 56; and a pawl and ratchet connection consisting of a pivoted spring pressed pawl 60 on the inner end of the arm 58 and a ratchet 61 on the inner end of the shaft 30. The electric motor 37 is disposed behind the base 23 of the supporting structure 18, as shown in Figure 1. The shaft 38, that is the shaft which is driven by the electric motor 37 by the first mentioned belt and pulley connection, is journalled in bearings 62 on the central portion of the standard 24 and has the pulleys 40 and 42 fixedly connected thereto. The pulley 43 of the second mentioned belt and pulley connection is loosely mounted on a horizontally extending shaft 63 which extends transversely across the lower rear portion of the standard 24 and is journalled in suitable bearings on the standard. The clutch member 45 is secured to and driven by the pulley 43 and is shiftable axially on the shaft 63 into and out of interlocked relation with the clutch member 46. The latter is fixedly secured to the shaft 63 and operates to effect drive of said shaft when the axially movable clutch member 45 is shifted into interlocked relation with it. The pinion 47 is fixedly connected to the shaft 63 with the result that it operates to drive the gear 48 in response to drive of the shaft 63. The clutch member 45 is shifted into interlocked relation with the clutch member 46 by way of a foot pedal 64 which is pivoted to a bracket 65 on the base 23 and is connected to one end of a cable 66. The latter extends over a sheave 67 and is anchored to a horizontal rod 68. The latter is suitably mounted for longitudinal sliding movement and is provided at one end thereof with a radially extending arm 69. The outer end of this arm abuts against the outer end of the hub of the pulley 43. When the foot pedal 64 is depressed the cable 66 is pulled in such manner that the rod 68 is shifted axially and operates through the medium of the arm 69 to slide the clutch member 45 into interlocked relation with the clutch member 46 and thus establish a driving connection between the pulley 43 and the pinion carrying shaft 63. A coil spring 70 extends around the inner end of the rod 68 and serves to shift the latter so as to disengage the clutch member 45 from the clutch member 46 upon release of the foot pedal 64. When current is supplied to the electric motor 37 and the foot pedal 64 is depressed so as to bring the two clutch members into interlocked relation, the rod 54 is caused through the medium of the link 52 to slide up and down. On the upstroke of the rod, the arm 56 which is fixed to the central portion of the rod 54 operates through the medium of the pin 59 to swing or rock upwards the arm 58. On the downstroke of the rod 54 the arm 56 serves to swing or rock downwards the arm 58. The pawl 60 of the ratchet connection between the arm 58 and the shaft 30 for supporting the lower feed roll 28 is so arranged that on downward rocking of the arm 58 it meshes with the ratchet 61 and thus serves to rotate the shaft 30. It is further so arranged that during upward rocking or swinging movement of the arm 58 it rides loosely over the teeth of the ratchet 61. Due to the fact that the two feed rolls are geared together by the gears 35 and 36 they are conjointly driven in reverse directions in connection with rocking of the arm 58. When the foot pedal 64 is released and the clutch members 45 and 46 are out of interlocked relation, the feed rolls 28 and 29 remain idle, whereas when the foot pedal is depressed so as to effect interlocking of the two clutch members, the two feed rolls are conjointly and reversely driven in an intermittent manner. During drive of the two feed rolls the composite strip 17 of patch forming material is fed step by step transversely across the worktable 19.

*Patch cutting mechanism*

The mechanism 21 serves to cut the strip 16 so as to form the patches 15 with the exception of the tabs 17. It operates automatically in connection with operation of the apparatus as a whole and consists of a head 71, a vertically extending head driving spindle 72, a knife 73, and a collar 74. The head 71 is located directly above the end of the worktable 19 that is remote from the feed rolls 28 and 29, and overlies a die ring 75. The latter is mounted in a circular recess 76 in the upper portion of the worktable and is of such height that the top face thereof is flush with the top face of the worktable. Said die ring is so located that the strip 16 of patch forming material is drawn across it in connection with intermittent or step by step feed thereof by the feed rolls 28 and 29. The head 71 of the mechanism 21 is fixed to the lower end of the spindle 72 and is adapted to rotate with such spindle and to move vertically with the latter to and from the strip 16. It carries the knife 73, as shown in Figure 7, and has a disk 77 at its lower end. This disk is pivotally connected to the head and is adapted to engage the strip and hold the latter in place when the head is lowered into its patch cutting position. The spindle 72 is located in front of the standard 24 of the supporting structure 18 and has a sleeve 78 fixed to its central portion. The upper end of the spindle is journaled in a bearing 79 at the outer end of the arm 26. The sleeve 78 on the central portion of the spindle is journaled in a bearing 80 at the outer end of the horizontally extending arm 25. The lower end of the spindle is journaled in a bearing 81 which is secured to the lower end of a vertically extending plate 82. The upper end of this plate is bolted or otherwise secured to the outer or front portion of the bearing 80. The spindle is not only rotatably mounted by the bearings 79, 80 and 81 but is also vertically slidable in such bearings. Driving of the spindle is effected by way of a pulley 83 on the shaft 38, a pulley 84 around the upper end of the spindle and an endless belt 85. The pulley 83 is fixed to the shaft 38 so that it is driven thereby in connection with operation or drive of the electric motor 37. The pulley 84 is connected by vertical splines (not shown) to the spindle so that it operates to drive the spindle while at the same time it permits the latter to slide vertically. It rests loosely on the bearing 79 at the outer end of the arm 26 and is forced downwards against the bearing by a coil spring 86. The latter surrounds the upper end of the spindle and abuts against a collar at the upper extremity of said spindle. The endless belt 85 extends around the pulley 83 on the shaft 38 and the pulley 84 around the upper end of the spindle 72. A pair of idler pulleys 87 and 88 take up the slack in the belt 85. The pulley 87 is applied to the central portion of one of the reaches of the belt and is carried by a bracket 89 which is adjustably mounted on a horizontally extending shaft 90. The latter is connected to and projects rearwardly from the upper end of the supporting structure 18. The idler pulley 88 is applied to the central portion of the other reach of the belt 85 and is carried by a bracket 91 on the extreme outer end of the shaft 90. During operation of the electric motor 37 the shaft 38 is driven as previously pointed out through the medium of the pulleys 39 and 40 and the endless belt 41 and it in turn operates through the medium of the pulleys 83 and 84 and the endless belt 85 to drive the spindle 72.

The spindle 72 is adapted to be raised and lowered automatically in order to bring the knife carrying head 71 out of and into its cutting position with respect to the composite strip 16 of patch forming material by way of mechanism comprising a cam wheel 92 which is fixedly secured to one end of the shaft 49 and embodies a circular eccentrically positioned cam groove (not shown); a vertically extending link 93 which is provided at its lower end with a roller 94 and is arranged so that the roller is disposed in the cam groove in the cam wheel 92; and a rocker lever 95 which is centrally fulcrumed on a pin 96 and is actuated by the link 93. The rocker lever 95 is located at one side of the standard 24 of the supporting structure 18 and has its rear end pivotally connected to the upper end of the link 93. The front end of the lever is provided with a fork 97 and this straddles a pin 98 on a plate 99. The latter fits against one side of the bearing 80 at the outer end of the arm 25 and is adapted to slide vertically in connection with rocking of the arm 95. The upper end of the plate 99 is provided with a collar 100 which fits between the upper end of the sleeve 78 on the central portion of the spindle 72 and a collar 101. The latter is spaced above the sleeve 78 and is fixedly secured to the spindle. When the clutch members 45 and 46 are in interlocked relation in connection with the operation of the apparatus, the shaft 49 is driven and operates through the medium of the cam wheel 92 and the link 93 to rock the lever 95. When the lever is rocked in one direction the spindle is raised due to upward sliding movement of the plate 99 and the collar 100 and in connection with reverse rocking of the lever 95 the spindle 72 is caused to slide downwards. The cam wheel 92 is so arranged that the spindle 72 is shifted or slid downwards in order to bring the head 71 into contact with the strip 16 when the strip is at rest on the worktable 19 and is also arranged so as to cause the spindle and head to slide or move upwards during feed of the strip.

The knife 73 is positioned at approximately a 45° angle with respect to the horizontal and embodies a blade 102 at its lower end. It is mounted for longitudinal sliding movement in a slideway 103 in the cutting head 71 as best shown in Figure 7. The slideway permits the knife to be slid or shifted downwards and outwards for the purpose of effecting insertion of the blade 102 in the composite strip 16 of patch forming material. Sliding movement of the knife with respect to the slideway is restricted by way of a pin 104 which extends transversely across the slideway and fits in a longitudinally extending slot 105 in the knife. A compression spring 106 extends between the pin and the upper end of the knife and serves to retract the knife after a patch cutting operation.

The collar 74 of the patch cutting mechanism 21 extends around the upper end of the knife carrying head 71 and is connected to the latter by way of vertically extending splines 107. Such splines connect the collar for rotation with the head while at the same time they permit the collar to slide vertically relatively to the head. As shown in Figure 7, the collar 74 has an annular groove 108 in the central portion thereof and embodies at its lower end a depending circular flange 109. The inner face of this flange is frusto-conical and is adapted to engage the upper exposed end of the knife 73 (see Figure 9). When the collar 74 is moved or slid downwards relatively to the head 71 the flange 109 urges the knife downwards and outwards and causes the blade 102 on the lower end of the knife to penetrate the strip 16 of patch forming material. Since the head 71 rotates the blade is caused to swing in a circular course and thus effects cutting of the strip. The downward action of the collar causes progressive feed of the knife into the strip 16 and in this manner the strip is cut in the desired fashion. The die ring 75 is located directly beneath the blade 102 and embodies in the upper face thereof an annular cutting groove 110. It also embodies a cutout 111 for a pad 112 of resilient material such for example as rubber. The upper face of this pad 112 is coplanar with the upper or top face of the die ring 75. During a cutting operation the blade 102 travels in a circular course and moves downwards and outwards as hereinbefore described. As the blade progressively penetrates the layers 16ᵃ and 16ᵇ of the strip and swings in a circular course it results in a truly circular tapered or bevel-type cut 113 in such layers (see Figure 4). When the blade is urged further downwards and outwards in connection with a cutting operation it moves into the cutting groove 110 in the die ring 75 and forms a discontinuous circular cut 114 in the holland sheet 16ᶜ. The cut 114 is discontinuous for the reason that when the blade 102 traverses the resilient pad 112 in the die ring cutout 111 the holland sheet is depressed without being cut. However when the blade traverses the cutting groove 110 in the die ring the holland sheet, due to the supporting action of the ring is cut by the blade. The ring 75 is formed of metal or any other suitable rigid material. The apparatus is so designed that when the strip 16 of patch forming material is at rest on the worktable 19 the head 71 is moved downwards into its cutting position. Thereafter the collar 74 is moved or shifted downwards so as to cause the knife 73 to move downwards. During downward movement of the knife the blade 102 in connection with rotation of the head forms the truly circular tapered or bevel-type cut 113 in the outer and inner layers 16ᵃ and 16ᵇ of the strip 16 and the discontinuous substantially circular cut 114 in the holland sheet 16ᶜ. The apparatus is further designed so that at the conclusion of cutting of the strip by the blade 102 the collar 104 moves upwards automatically. During upward movement of the collar the spring 106 retracts the knife 73. After retraction of the knife by the spring the head 71 moves upwards so as to release the strip 16 for further feed by the rolls 28 and 29 of the intermittent feed mechanism 20.

The collar 74 is automatically shifted vertically relatively to the head 71 by mechanism consisting of a gear 115 which meshes with and is driven by a gear 115ᵃ on the shaft 49 and is fixed to a horizontally extending shaft 116 behind the lower end of the standard 24 of the supporting structure 21; a cam wheel 117 which is fixedly connected to the shaft 116 and embodies a circular eccentrically positioned cam groove (not shown); a substantially vertical link 118 which is provided at its lower end with a roller 119 and is arranged so that the roller is disposed in the cam groove in the cam wheel 117; and a rocker lever 120 which is centrally fulcrumed on a pin 121 and is actuated by the link 118. The lever 120 is located at one side of the standard 24. The rear end of the lever is pivotally connected to the upper end of the link 118. The front end of the rocker lever 120 is provided with a fork 122 and this surrounds the collar and embodies a pair of opposed rollers 123. The rollers fit within the annular groove 108 in the central portion of the collar 74 and serve to shift the collar vertically in response to rocking of the lever 120. The shaft 116 to which the gear 115 and the cam wheel 117 are fixed is journaled in bearings 124 on the lower end of the standard 24. The mechanism for shifting the collar 74 vertically relatively to the knife carrying head 71 is so designed and constructed that it operates to shift the collar 74 downwards after downward shift of the head 71 into its cutting position and also to shift the collar 74 upwards directly before upward shift of the cutting head by the means or mechanism consisting of the cam wheel 92, the link 93 and the rocker lever 95.

Associated with the patch cutting mechanism 21 is a presser plate 125. This presser plate overlies the die ring equipped portion of the worktable 19 and has a circular part 126 which surrounds the disk 77 at the lower end of the knife carrying head 71. It also has an upstanding arm 127, the upper end of which is connected to the plate 99 by bolt and slot connections 128. When the head 71 is lowered or shifted downwards into its strip cutting position the presser plate 125 is caused to move into engagement with the strip. On the upstroke of the head 71 after a strip operation the presser plate 125 is caused to move upwards so as to release the strip 16 for feed by the intermittent feed mechanism 20.

Tab cutting mechanism

The mechanism 22 serves to cut the tab 17 on each patch that is cut in a preliminary manner or fashion by the mechanism 21 and in addition to eject the completed patch from the strip 16 of patch forming material. It is located between the cutting mechanism 21 and the feed rolls 28 and 29 and operates on the strip 16 when the latter is at rest on the worktable 19. As its main or principal parts the tab cutting mechanism 22 comprises a blade-equipped plunger 129, an ejector plunger 130, and a hammer 131. The plunger 129 extends vertically and is mounted for vertical sliding movement in a bearing 132. The latter is carried by a bracket 133 which is bolted or otherwise fixedly secured to the bottom face of the worktable 19. The upper end of the plunger 129 fits within a hole 134 in the worktable during upstroke of the plunger. It has a flat circular upper end face and includes at its upper extremity a laterally extending tab cutting blade 135. The latter projects in the same direction as, and is aligned with, the resilient pad 112 in the cutout 111 of the die ring 75 and is adapted when the plunger 129 is at the end of its upstroke to project slightly above the top face of the worktable 19, as shown in Figure 8. A ring 136 overlies the hole 134 in the worktable 19 and serves as a bearing for the upper end of the blade-equipped plunger 129. This ring fits within a circular recess 137 in the upper portion of the worktable and has a groove 138 for accommodating the blade 135. The worktable 19 is provided with a groove 139 which is aligned with the groove 138 in the ring 136 and serves to accommodate the blade 135 during the downstroke of the plunger 129. While the strip 16 is at rest on the worktable the plunger 129 is caused, as hereinafter described, to move upwards so as to bring the blade 135 above the upper face of the worktable and into contact with the portion of the holland sheet 16ᶜ which is adjacent the ends of the discontinuous cut 114. When the plunger 129 is at the end of its upstroke the hammer 131 is adapted, as described hereafter, to snap downwards against the strip 16 and cause the blade 135 to penetrate the holland sheet 16ᶜ and thus form the tab 17. After the downstroke of the hammer 131 and resultant cutting of the tab 17, the blade equipped plunger 129 moves downwards so as to permit the fully or completely cut patch to be ejected from the strip 16 by the ejector plunger 130. The plunger 129 is reciprocated or slid up and down by mechanism consisting of a cam 140 which is fixed to a horizontally extending shaft 141 in front of the lower portion of the standard 24 of the supporting structure 18; and a link 142 which extends vertically and has the upper end thereof pivotally connected to the lower end of the plunger 129 and its other end provided with a roller 143 in contact with the periphery of the cam 140. The shaft 141 is journaled in a pair of bearing brackets 144 on the lower end of the standard 24 and is driven from the shaft 49 of the intermittent feed mechanism 20 by way of a chain and sprocket connection comprising a sprocket 145 on the shaft 49, a sprocket 146 on the shaft 141 and an endless chain 147 around the two pulleys. When the apparatus is in operation, that is when current is supplied to the electric motor 33 and the foot pedal 64 is depressed so as to bring the clutch members 45 and 46 into interlocked relation, the last mentioned belt and pulley connection operates to drive the shaft 141 from the shaft 49 and the shaft 141 operates to turn to drive the cam 140. During rotation of the cam 140 the link 142 is caused to move up and down due to the action of the roller 143 on the periphery of the cam 140 and effects the desired reciprocation or vertical sliding movement of the blade-equipped plunger 129. The cam 140 is so designed that it operates while the strip 16 of patch forming material is at rest on the worktable 19 to slide the plunger 129 upwards into its operative or tab cutting position and then to slide the plunger downwards.

The ejector plunger 130 is disposed over the worktable 119 and is in vertical alignment with the blade-equipped plunger 129. It is slidable up and down in a vertical elongated bearing 148 which is carried by a bracket 149 on the central portion of the standard 24. For the purpose of reciprocating or sliding up and down the ejector plunger 130 the apparatus includes mechanism consisting of a cam 150 which is fixedly secured to the shaft 141; a rocker lever 151 which is centrally fulcrumed by way of a pin 152 and has at the front end thereof a roller 153 in contact with the periphery of the cam 150; a link 154 which extends vertically and has the lower end thereof pivotally connected to the other or rear end of the rocker lever 151; and a substantially horizontal lever 155 which is located at one side of, and extends transversely across the standard 24 and has its rear end pivotally connected to a bracket 156 on one of the bearings 62 and its central portion pivotally connected to the upper end of the link 154. The front end of the lever 155 is provided with a fork 157 and this straddles a pin 158 which is carried by a laterally extending lug 159 on the central portion of the ejector plunger 130. The lug, as shown in Figures 12 and 13, extends through a vertically extending slot 160 in the lower end of the bearing 148. When the cam 150 is driven it operates through the medium of the roller 151 to rock the lever 153 and the lever in turn serves to reciprocate vertically the link 154. In response to reciprocation of the link 154 the lever 155 swings up and down and effects reciprocation of the ejector plunger 130. The cam 150 is so arranged that the plunger 130 is caused to move into contact with the upper face of the composite strip 17 when the blade-equipped plunger 129 is at the end of its upstroke. As a result of this arrangement the partially cut patch over the plunger 129 is firmly clamped prior to actuation of the hammer 131. The cam 150 is also arranged so that during the downstroke of the blade-equipped plunger 129 the ejector plunger 130 is caused to move downwards through the ring 136 and the hole 134 in order to effect disconnection or ejection of the cut patch from the strip. The cam 140 is so arranged that the downstroke of the blade-equipped plunger 129 is faster than the downstroke of the ejector plunger and hence the cut patch during the downstrokes of the two plungers is released for discharge into a discharge chute 161.

The hammer 131 of the tab cutting mechanism 22 is located adjacent the lower end of the ejector plunger 130 and is shaped to fit therearound. It overlies the blade 135 on the upper end of the plunger 129 and has an upwardly extending arm 162. The latter fits slidably against the lower end of the bearing 148 for the ejector plunger and is connected to such bearing by bolt and slot connections 163. Said connections permit the arm and hammer to slide vertically to and from the blade 135. A tension spring 164 serves to urge the hammer 132 downwards towards the blade 135. The upper end of this spring is anchored to a pin 165 on the upper end of the arm 162. The lower end of the spring is anchored to a pin 166 on a plate 167. The latter is disposed adjacent the outer face of the arm 162 and is fixedly connected to the lower end of the bearing 148 by way of bolts 168. The latter extend through slots 169 in the central portion of the arm 162. Said slots 169 are vertically elongated and permit the arm and hammer to move vertically relatively to the bearing. The upper end of the arm 162 is provided with a laterally extending finger 170. This finger, as shown in Figure 12, overlies the pin carrying lug 159 on the ejector plunger 130. On the upstroke of the ejector plunger the lug 159 engages the finger 170 and raises the arm 162 and the hammer 131 against the force of the tension spring 164. The hammer is controlled by means of an L-shaped latch 171. This latch is pivotally connected to the front central portion of the bearing 148 and embodies a depending arm 172 and a substantially horizontal arm 173. The depending arm 172 is provided at its lower end with a hook 174 and this hook is adapted when the latch 171 is turned or rotated in a clockwise direction as viewed in Figure 7 to be brought into hooked relation with a pin 175 on the upper end of the arm 162. The latch 171 serves temporarily to hold the hammer 131 in its raised position during the initial part of the downstroke of the ejector plunger 130 toward the blade-equipped plunger 129. A tension spring 176 serves to urge the latch into hooked or locked relation with the pin 175. One end of this spring 176 is anchored to a pin on the upper end of the bearing 148 and the other end of the spring is anchored to the distal end of the arm 173. The latch is released by means of a vertically extending rod 177. The upper end of this rod is connected to the upper end of the ejector plunger 130 by way of an arm 178. The lower end of the rod 177 overlies the outer or distal end of the latch arm 173. During initial downward movement of the ejector plunger 130 the rod comes in contact with the arm 173. During further downward movement of the ejector plunger the rod swings the latch 171 in a counterclockwise direction as viewed in Figure 7 and results in disengagement of the hook 174 from the pin 175. Upon release of the pin the tension spring 164 snaps the hammer 131 downwards against the strip 16. As soon as the hammer strikes or is impacted against the strip the blade 135 on the plunger 129 penetrates through the holland sheet 16ᶜ and thus effects cutting of the tab 17 on the adjacent patch. After cutting of the tab the hammer 131 remains stationary while the ejector plunger 130 moves further downwards and effects disconnection of the cut patch from the strip 16. On the upstroke of the ejector plunger the hammer 131 moves upwards as soon as the lug 159 strikes the finger 170. In addition the rod 177 moves upwards with the plunger and permits the spring 176 to swing the latch 171 into hooked relation with the pin 175. As soon as the hook 174 is in hooked relation with the pin the hammer is held against downward movement. While the hammer and ejector plunger are in their raised positions the strip 16 of patch forming material is fed by the feed mechanism 20. The feed mechanism 20 is so designed that when the ejector plunger 130 and the hammer 131 are in their raised position the strip 16 is fed the correct distance to bring the partially cut patch, that is the patch that has been previously cut by the blade 102 of the knife 73, over the blade equipped plunger 129.

Operation

When it is desired to use the apparatus, the electric motor 37 is started and the foot pedal 64 is depressed so as to bring the clutch members 45 and 46 into interlocked relation. As soon as the foot pedal is depressed the shafts 49, 51, 116 and 141 start to rotate and the feed mechanism 20, the patch cutting mechanism 21, and the tab cutting mechanism 22 are set in motion. As heretofore pointed out, the mechanisms 21 and 22 are inactive or inoperative during feed of the strip 16 of patch forming material across the worktable 19. When the strip comes to rest the knife carrying head 71 is moved downward into contact with the strip by the action of the cam wheel 92, the link 93 and the rocker lever 95. After downward shift of the head 71 the collar 74 of the mechanism 20 is shifted downwards as the result of the action of the cam wheel 117, the link 118, and the rocker lever 120. During downward shift of the collar 74 the knife 73 is urged downwards and outwards and causes the blade 102 to form the truly circular tapered or bevel-type cut 113 in the outer and inner rubber layers 16a and 16b and the discontinuous substantially circular cut 114 in the holland sheet 16c of the strip 16. At the same time the blade 102 of the knife 73 is operating on the strip 16 the blade equipped plunger 129, the ejector plunger 130 and the hammer 131 operate on the previously cut patch so as to form the tab 17 on such patch. As heretofore pointed out when the strip 16 is at rest the blade equipped plunger 129 moves into engagement with the holland sheet 16c of the strip 16 and the ejector plunger 130 moves downwards. During the initial part of the downstroke of the ejector plunger the latch 171 is released by the action of the rod 170 and the hammer 131 snaps downwards and causes the blade 135 on the plunger 139 to penetrate the holland sheet and effect cutting of the tab 17. After cutting of the tab the hammer 131 remains stationary and the ejector plunger 130 and the blade-equipped plunger 129 move downwards at different speeds. During the latter part of the down stroke of the ejector plunger the completely formed patch is disconnected from the strip 16 and is directed into the discharge chute 161 by way of an air blast or any other suitable means (not shown). During the upstrokes of the knife carrying head 71, the ejector plunger 130, and the hammer 131, the strip 16 is fed by the rolls 28 and 29 a sufficient distance so as to bring the patch that is partially cut by the blade 102 over the upper end of the plunger 129.

The herein described apparatus is designed to be operated continuously and serves effectively and efficiently to cut tab equipped patches in rapid succession. By reason of the fact that the patches which are cut by the apparatus embody the tabs 17 on the holland pieces such pieces may be readily removed in connection with use of the patches. The apparatus is entirely automatic when in operation and efficiently fulfills its intended purpose.

Whereas the apparatus has been defined as being expressly or primarily adapted for use in cutting tire patches from a composite strip consisting of an outer layer of vulcanized or cured rubber, an inner layer of uncured rubber, and a sheet of holland or like material, it is to be understood that it also may be used to cut other kinds or types of circular tab equipped beveledged articles.

It is also to be understood that the invention is not to be restricted to the details set forth since these may be modified within the scope of the appended claims without departing from the spirit and scope of the invention.

Having thus described the invention, what I claim as new and desire to secure by Letters Patent is:

1. In an apparatus of the character described, the combination of a table adapted to support thereabove a strip with a thin backing sheet on the under face thereof, a knife supported above the table so that it is bodily rotatable in a circular course and also movable to and from the table, means for rotating the knife, means for moving the knife during rotation thereof towards the table so that it penetrates and cuts the strip and sheet, and means for causing the knife during penetration in the sheet to form but a discontinuous cut.

2. In an apparatus of the character described, the combination of a table adapted to support thereabove a strip with a thin backing sheet on the underface thereof, and mechanism for forming a truly circular cut in the strip and an aligned discontinuous substantially circular cut in the sheet, comprising a knife supported above the table so that it is bodily rotatable in a circular course and also movable to and from the table, means for rotating the knife, means for feeding the knife during rotation thereof toward the table for strip and sheet cutting purposes, and a rigid strip supporting die on the table directly beneath the knife adapted when the knife is moved in proximity thereto after cutting of the strip to coact with the knife to effect cutting of the sheet and embodying beneath the course of travel of the knife a cutout whereby the cut in the sheet is rendered discontinuous.

3. In an apparatus of the character described, the combination of a table adapted to support thereabove a strip with a thin backing sheet on the underface thereof, and mechanism for forming a truly circular cut in the strip and an aligned discontinuous substantially circular cut in the sheet, comprising a knife supported above the table so that it is bodily rotatable in a circular course and also movable to and from the table, means for rotating the knife, means for feeding the knife during rotation thereof toward the table for strip and sheet cutting purposes, and a rigid strip supporting die on the table directly beneath the knife adapted when the knife is moved in proximity thereto after cutting of the strip to coact with the knife to effect cutting of the sheet and embodying beneath the course of travel of the knife a cutout with a resilient pad therein whereby the cut in the sheet is rendered discontinuous.

4. In an apparatus of the character described, the combination of a table adapted to support thereabove a strip with a thin backing sheet on the underface thereof, and mechanism for forming a truly circular cut in the strip and an aligned discontinuous substantially circular cut in the sheet, comprising a knife supported above the table so that it is bodily rotatable in a circular course and also movable to and from the table, means for rotating the knife, means for feeding the knife during rotation thereof toward the table for strip and sheet cutting purposes, and a rigid strip supporting die on the table directly beneath the knife having an arcuate cutting groove therein adapted to receive the knife after it has cut the strip and to coact therewith to effect cutting of the sheet, and also having a cutout therein across the groove whereby the cut in the sheet is rendered discontinuous.

5. In a cutting apparatus of the character described, the combination of a table adapted to support thereabove a strip with a thin backing sheet on the underface thereof, mechanism associated with the table for forming a continuous cut through the strip and an aligned discontinuous cut through the sheet, and mechanism operating in synchronism with the first mentioned mechanism and also associated with the table for cutting the portion of the sheet adjacent and outwards of the ends of the discontinuous cut so as to form a tab on the portion of the sheet within said discontinuous cut.

6. In a cutting apparatus of the character described, the combination of a table adapted to support thereabove a strip with a thin backing sheet on the underface thereof, mechanism associated with the table for forming a truly circular cut in the strip and an aligned discontinuous substantially circular cut in the sheet, and mechanism also associated with the table for cutting the portion of the sheet adjacent and outwards of the ends of the discontinuous cut so as to form a tab on the portion of the sheet within said discontinuous cut.

7. In a cutting apparatus of the character described, the combination of a table adapted to support thereabove a strip with a thin backing sheet on the underface thereof, power driven mechanism associated with the table for forming a truly circular downwardly flared bevel-type cut in the strip and an aligned discontinuous substantially circular cut in the sheet, and power driven mechanism also associated with the table for cutting the portion of the sheet adjacent and outwards of the ends of the discontinuous cut so as to form a tab on the portion of the sheet within said discontinuous cut.

8. In a cutting apparatus of the character described, the combination of a table, mechanism for intermittently feeding across the top face of said table a strip with a thin backing sheet on the underside thereof, power driven mechanism associated with the table and operative automatically during one of the intervals when the strip and sheet are at rest on the table to form a truly circular cut in the strip and an aligned discontinuous substantially circular cut in the sheet, and power driven mechanism also associated with the table and operative automatically during another rest period to cut the portion of the sheet adjacent and outwards of the ends of the discontinuous cut so as to form a tab on the portion of the sheet within said discontinuous cut.

9. In a cutting apparatus of the character described, the combination of a table, a power source associated with the table, mechanism actuated by said source for feeding across the table a flexible strip with a thin backing sheet adhesively secured to the under face thereof, mechanism actuated by said power source and operative automatically during one of the intervals when the strip and sheet are at rest on the table to form a truly circular downwardly flared bevel-type cut in the strip and an aligned discontinuous substantially circular cut in the sheet, and mechanism also actuated by said power source and operative automatically during another rest period of said strip and sheet to cut the portion of the sheet adjacent and outwards of the ends of the discontinuous cut so as to form a tab on the portion of the sheet within said discontinuous cut.

10. In a cutting apparatus of the character described, the combination of a table having a vertical hole therethrough, mechanism for feeding a strip with a thin backing sheet on the under face thereof step by step across the table and over the hole, mechanism associated with the table and ahead of the hole operative automatically during one of the intervals when the strip and sheet are at rest on the table to form a continuous cut in the strip and an aligned discontinuous cut in the sheet, and mechanism including a tab shaped blade in the hole and operative automatically during a subsequent rest period to cut the portion of the sheet adjacent and outwards of the ends of the discontinuous cut so as to form a tab on the portion of the sheet within said discontinuous cut.

11. In a cutting apparatus of the character described, the combination of a table having a vertical hole therethrough, mechanism for feeding a strip with a thin backing sheet on the under face thereof step by step across the table and over the hole, mechanism associated with the table and ahead of the hole operative automatically during one of the intervals when the strip and sheet are at rest on the table to form a continuous cut in the strip and an aligned discontinuous cut in the sheet, and mechanism operative automatically during another rest period to cut the portion of the sheet adjacent and outwards of the ends of the discontinuous cut so as to form a tab on the portion of the sheet within said discontinuous cut and comprising a tab shaped blade in the hole and a vertically movable hammer above the table and over the blade.

12. In a cutting apparatus of the character described, the combination of a table having a vertical hole therein, power driven mechanism for feeding a strip with a thin backing sheet on the under face thereof step by step across the table and over the hole, power driven mechanism associated with the table and ahead of the hole operative automatically during one of the intervals when the strip and sheet are at rest on the table to form a continuous cut in the strip and an aligned discontinuous cut in the sheet, power driven mechanism operative automatically during another rest period to cut the portion of the sheet adjacent and outwards of the ends of the discontinuous cut so as to form a tab on the portion of the sheet within said discontinuous cut and comprising a vertically slidable plunger beneath the table and in alignment with the hole having a tab cutting blade at its upper end and adapted on the upstroke thereof to enter the hole and to bring the blade into cutting relation with the sheet, and a power actuated vertically reciprocatory ejector plunger positioned over the table and in alignment with the hole and adapted during the down stroke of the blade equipped plunger to move downwards into the hole and punch out the cut portions of the strip and sheet.

13. In a cutting apparatus of the character described, the combination of a table having a vertical hole therein, power driven mechanism for feeding a flexible strip with a thin backing sheet on the under face thereof step by step across the table and over the hole, power driven mechanism associated with the table and ahead of the hole operative automatically during one of the intervals when the strip and sheet are at rest on the table to form a truly circular downwardly flared bevel-type cut through the strip and an aligned discontinuous substantially circular cut in the sheet, mechanism operative automatically during another rest period or interval to cut the portion of the sheet adjacent and outwards of the ends of the discontinuous cut so as to form a tab on the portion of the sheet within said discontinuous cut and comprising a vertically slidable plunger beneath the table and in alignment with the hole having a tab cutting blade at the upper end thereof and adapted on the upstroke thereof to enter the hole and bring the blade into cutting relation with the sheet and a power actuated vertically slidable ejector plunger disposed over the table and in alignment with the hole and controlled so that on the downstroke thereof it first moves into clamped relation with the strip while the blade equipped plunger is in its up position and then follows the last mentioned plunger downwards into the hole and serves to punch out the cut portions of the strip and sheet.

14. In a cutting apparatus of the character described, the combination of a table having a vertical hole therethrough, power driven mechanism for feeding a strip with a thin backing sheet on the under face thereof step by step across the table and over the hole, power driven mechanism associated with the table and ahead of the hole, operative automatically during one of the intervals when the strip and sheet are at rest on the table to form a continuous cut in the strip and an aligned discontinuous cut in the sheet, power driven mechanism operative automatically during another rest period to cut the portion of the sheet adjacent and outwards of the ends of the discontinuous cut so as to form a tab on the portion of the sheet within said discontinuous cut and comprising a vertically slidable plunger beneath the table and in alignment with the hole having a tab cutting blade on the upper end thereof and adapted on the upstroke to enter the hole and bring the blade into cutting relation with the sheet and also comprising a vertically movable hammer disposed over the table and above the hole and adapted when the blade is in its operative position to move downwards against the strip and cause the blade to penetrate the sheet, and a power actuated vertically slidable ejector plunger over the table and in alignment with the hole, adapted during the downstroke of the blade equipped plunger to move downwards into the hole and punch out the cut portions of the strip and sheet and having an operative connection with the hammer whereby on its upstroke it serves to raise the hammer.

15. That improvement in the manufacture of a patch or like article from a composite strip in the form of a layer of patch forming material and a thin backing sheet on one face of the layer which comprises making a continuous cut through the layer and an aligned discontinuous cut in the backing sheet and cutting the portion of the sheet adjacent and outwards of the ends of the discontinuous cut to form a tab on the portion of the sheet within said discontinuous cut.

16. That improvement in the manufacture of a patch or like article from a composite strip in the form of a layer of patch forming material and a thin backing sheet adhesively secured to one face of the layer which comprises making a circular cut through the layer and an aligned discontinuous substantially circular cut in the backing sheet, and then cutting the portion of the sheet that is adjacent and outwards of the ends of the discontinuous cut so as to form a tab on the portion of the sheet within said discontinuous cut.

17. That improvement in the manufacture of a patch or like article from a composite strip in the form of a layer of patch forming material and a thin backing sheet adhesively secured to the under face of the layer which comprises forming a continuous downwardly flared cut through the layer and an aligned discontinuous cut through the backing sheet, then cutting the portion of the backing sheet adjacent and outwards of the ends of the discontinuous cut so as to form a tab on the portion of the sheet within said discontinuous cut, and then removing from the strip the cut portions of the layer and sheet.

JOHN WIMMER.